United States Patent [19]

Matsuzawa

[11] Patent Number: 5,059,999
[45] Date of Patent: Oct. 22, 1991

[54] AUTOFOCUS APPARATUS FOR A CAMERA
[75] Inventor: Yoshinori Matsuzawa, Hachioji, Japan
[73] Assignee: Olympus Optical Co., Ltd., Tokyo, Japan
[21] Appl. No.: 507,385
[22] Filed: Apr. 10, 1990
[30] Foreign Application Priority Data Apr. 14, 1989 [JP] Japan ................................. 1-94380

[51] Int. Cl.$^5$ ............................................. G03B 13/36
[52] U.S. Cl. .................................... 354/400; 354/402
[58] Field of Search ............... 354/400, 402, 403, 407, 354/408

[56] References Cited
U.S. PATENT DOCUMENTS 4,482,235 11/1984 Yasukawa et al. .
4,509,842 4/1985 Taniguchi et al. .
4,764,787 8/1988 Hamada et al. .................... 354/402
4,833,315 5/1989 Horikawa ........................... 354/403
4,841,325 6/1989 Hoshino et al. .
4,908,645 3/1990 Higashihara et al. .............. 354/402
4,914,464 4/1990 Azuma et al. ...................... 354/400
4,931,820 6/1990 Matsuzawa et al. .

Primary Examiner—Russell E. Adams, Jr.
Attorney, Agent, or Firm—Kenyon & Kenyon

[57] ABSTRACT

An autofocus apparatus for a camera which detects the defocus amount of an object image formed by a taking lens and drives the taking lens on the basis of the defocus amount. A movement coefficient correlating the defocus amount and the drive amount of the taking lens is calculated from the defocus amounts detected before and after the drive of the taking lens and the drive amount.

28 Claims, 10 Drawing Sheets

AUTOFOCUS APPARATUS FOR A CAMERA

BACKGROUND OF THE INVENTION

1. Field of the Invention

This invention relates to an autofocus apparatus for performing automatic focusing in a camera.

2. Description of Related Art

In conventional photographic cameras having autofocus apparatus, automatic focusing has been performed by detecting the amount and direction of deviation, along the optical axis, of the image plane where an object image is formed by a taking lens from the film plane, and moving the focusing optical system of the taking lens in accordance with the detected defocus amount and direction.

In such cameras, the drive amount of the focusing optical system is obtained by the formula: drive amount = movement coefficient × defocus amount and direction, using the movement coefficient inherent to each taking lens.

The movement coefficient inherent to each taking lens is stored in a non-volatile memory means for each taking lens and read out when it is needed.

On the other hand, in the case of such lenses as zoom lenses and macro lenses, a proper automatic focusing cannot be performed by using the same movement coefficient for their whole range of movement. In such a case, a plurality of movement coefficients are stored in the memory means, the position of the zoom lens or the focusing optical system is detected by a zoom encoder or a distance encoder, and a movement coefficient in the memory means corresponding to the detected positional information is used to make a proper automatic focusing.

Thus, the conventional autofocus apparatus requires the movement coefficients inherent to taking lenses or to the states of taking lenses and therefore need a plurality of memory means for the respective taking lenses, and a zoom encoder or an distance encoder, if necessary. Hence, the structure of the apparatus is much complicated.

Further, the movement coefficients inherent to the taking lenses are set in accordance with their design values, and the actual values may be different from the design values due to manufacturing errors. This results in an improper automatic focusing.

SUMMARY OF THE INVENTION

An object of the invention is to provide an autofocus apparatus with a simple structure for performing a proper automatic focusing, in which the movement coefficients inherent to taking lenses are abolished and the memory means for the respective taking lenses and the encoders for detecting the states of the taking lenses are not used.

Another object of the invention is to provide a autofocus apparatus in which an improper automatic focusing due to the manufacturing errors of taking lenses can be excluded.

In order to attain these objects, the autofocus apparatus according to the present invention uses as the movement coefficient the ratio of the drive amount of the focusing optical system to the change of the defocus amount detected after the drive of the focusing optical system relative to that detected before the drive, instead of using the movement coefficient inherent to each taking lens.

DESCRIPTION OF THE PREFERRED EMBODIMENT

Figure 1:
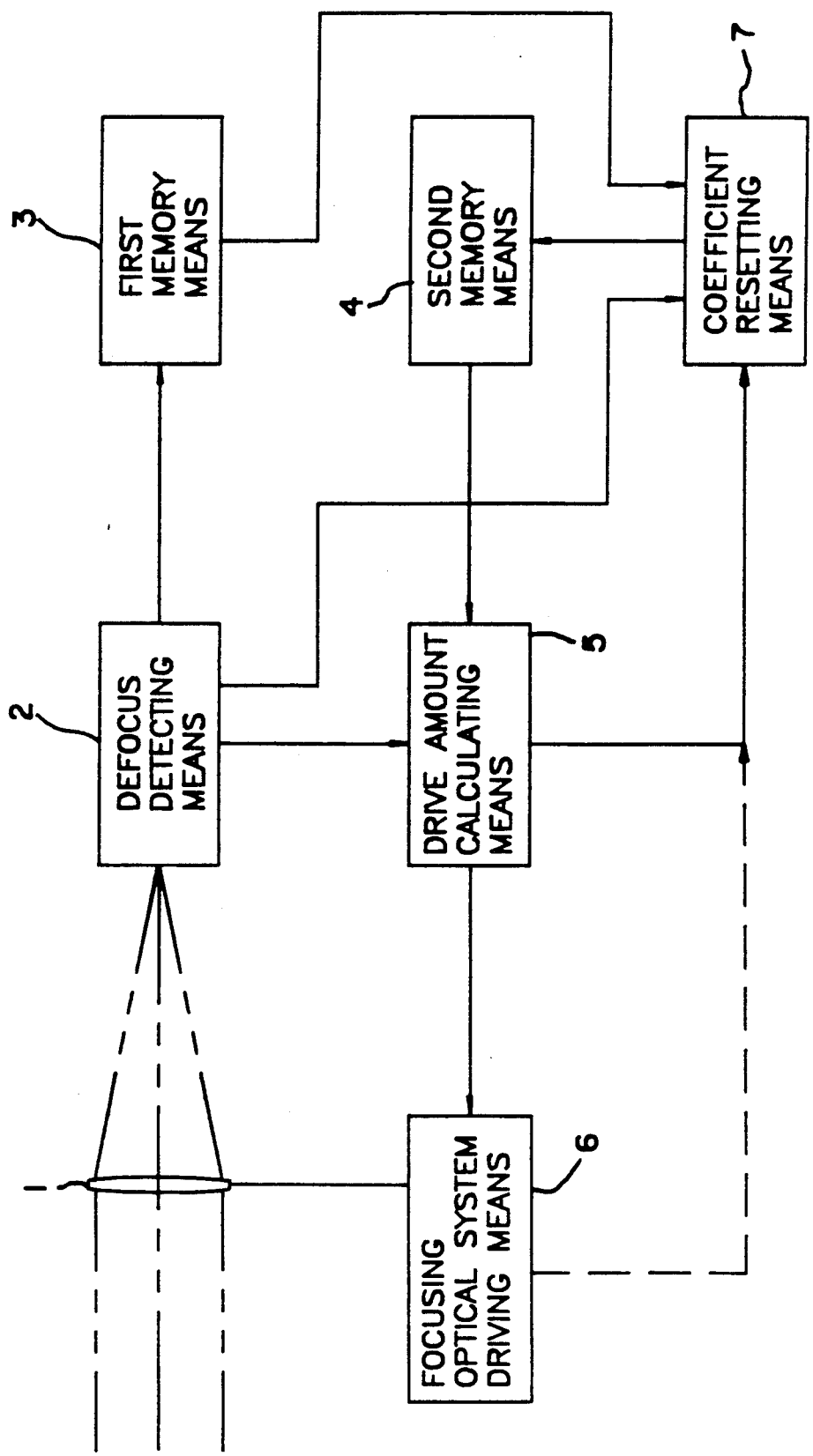
FIG. 1 is a block diagram for explaining the concept of the present invention.

First, the concept of the present invention will be explained. As shown in FIG. 1, an autofocus apparatus according to the present invention comprises a detecting means 2 for detecting the amount and direction of deviation of the image plane where an object image is formed by the taking lens, from the film plane; a first memory means 3 for storing the amount and direction of deviation detected by the detecting means 2; a second memory means 4 for storing a coefficient to be used for calculating the drive amount of the focusing optical system 1 of the taking lens; a drive amount calculating means 5 for calculating the drive amount of the focusing optical system 1 from the coefficient stored in the second memory means 4 and the amount and direction of deviation detected by the detecting means 2; a driving means 6 for driving the focusing optical system 1 in accordance with the output of the drive amount calculating means 5; a coefficient resetting means 7 for resetting after the drive of the focusing optical system 1 by the driving means 6 the value stored in the second memory means 4 on the basis of the output of the detecting means 2, the stored value of the first memory means 3, and the output of the drive amount calculating means 5 or the driving means 6.

The autofocus apparatus according to the present invention uses as the movement coefficient the ratio of the drive amount (moving amount) of the focusing optical system to the change of the defocus amount detected after the drive of the focusing optical system relative to that detected before the drive, instead of using the movement coefficient inherent to each taking lens.

Figure 2:
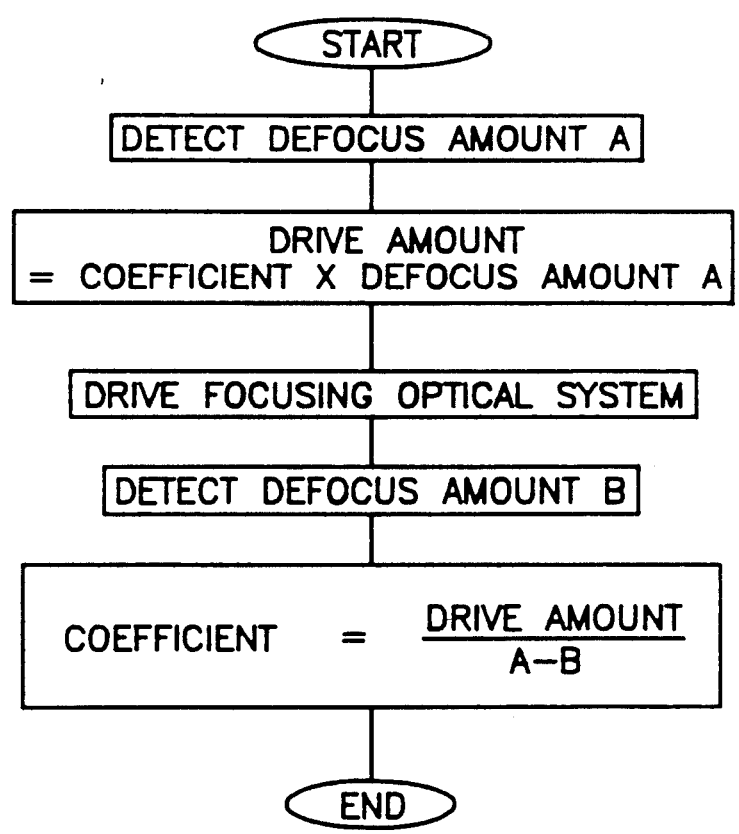
FIG. 2 is a flow chart of the basic operation of the present invention.

That is, as shown in the flow chart of FIG. 2, the defocus amount is detected. Let this defocus amount be defocus amount A. The drive amount of the focusing optical system can be obtained by the formula:

$$\text{Drive amount} = \text{movement coefficient} \times \text{defocus amount A}$$

In accordance with this drive amount, the focusing optical system is driven. Then, the defocus amount is detected again at this new position of the focusing optical system. Let the detected value be defocus amount B. The movement coefficient of the focusing optical system can be obtained by the formula:

Movement coefficient
= drive amount/change of defocus amount
= drive amount/defocus amount $A$ − defocus amount $B$ This movement coefficient is used as the movement coefficient for the next autofocus operation.

If the drive amount of the focusing optical system can be considered the same as the monitored actual moving amount of the focusing optical system, the actual moving amount instead of the drive amount can be used to obtain the movement coefficient. Furthermore, although the movement coefficient is not given at the time of the first autofocus operation, a provisional value may be given to perform the calculation.

Figure 3:
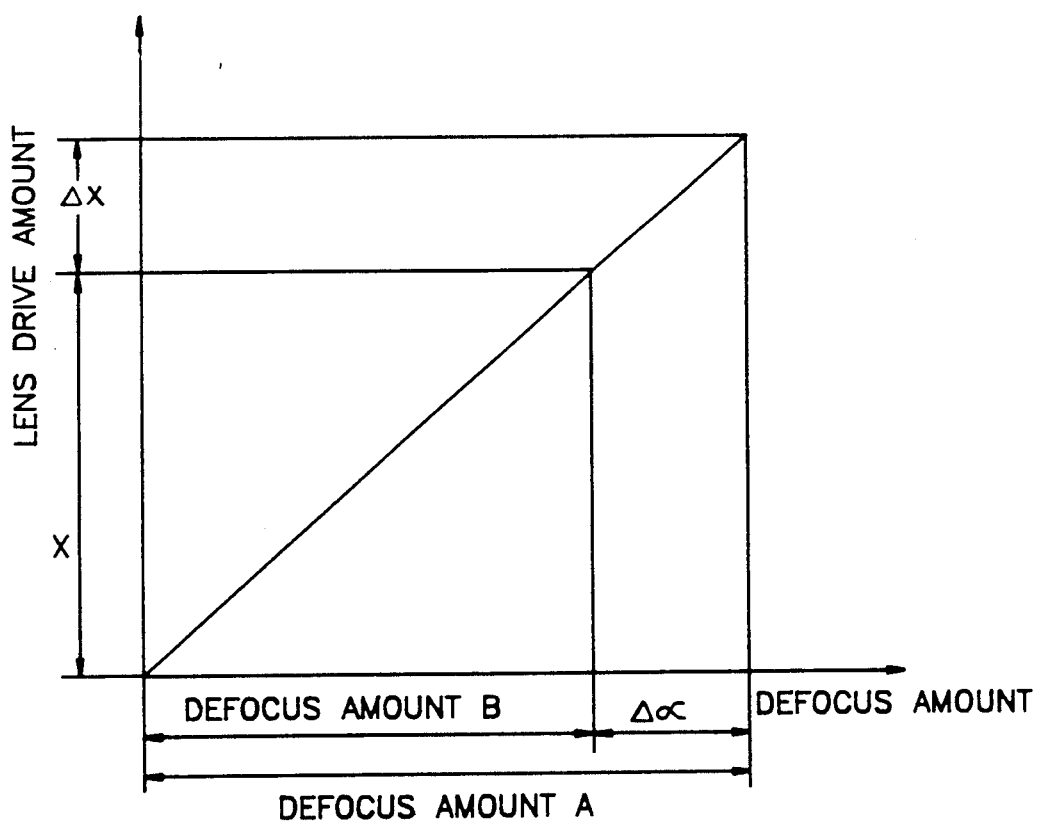
FIG. 3 is a graph for explaining the principle of the present invention.

FIG. 3 shows the principle of the present invention. If the lens drive amount can be considered proportional to the defocus amount, the movement coefficient is the slope of the proportional straight line. Thus, assuming that the first and second defocus amounts are detected for the same object, if the lens drive amount $\Delta x$ relative to the difference $\Delta a$ between the first and second detected defocus amounts A and B is known, the slope of the proportional straight line can be obtained by $\Delta x/\Delta a$. When the slope is obtained, the drive amount x necessary for focusing corresponding to defocus amount B can be given by the equation:

$$x = (\Delta x/\Delta a) \text{ defocus amount B}$$

Now, an embodiment of the present invention will be described. In this embodiment, the invention is embodied in an autofocus (hereinafter called "AF") camera with an interchangeable lens.

Figure 4:
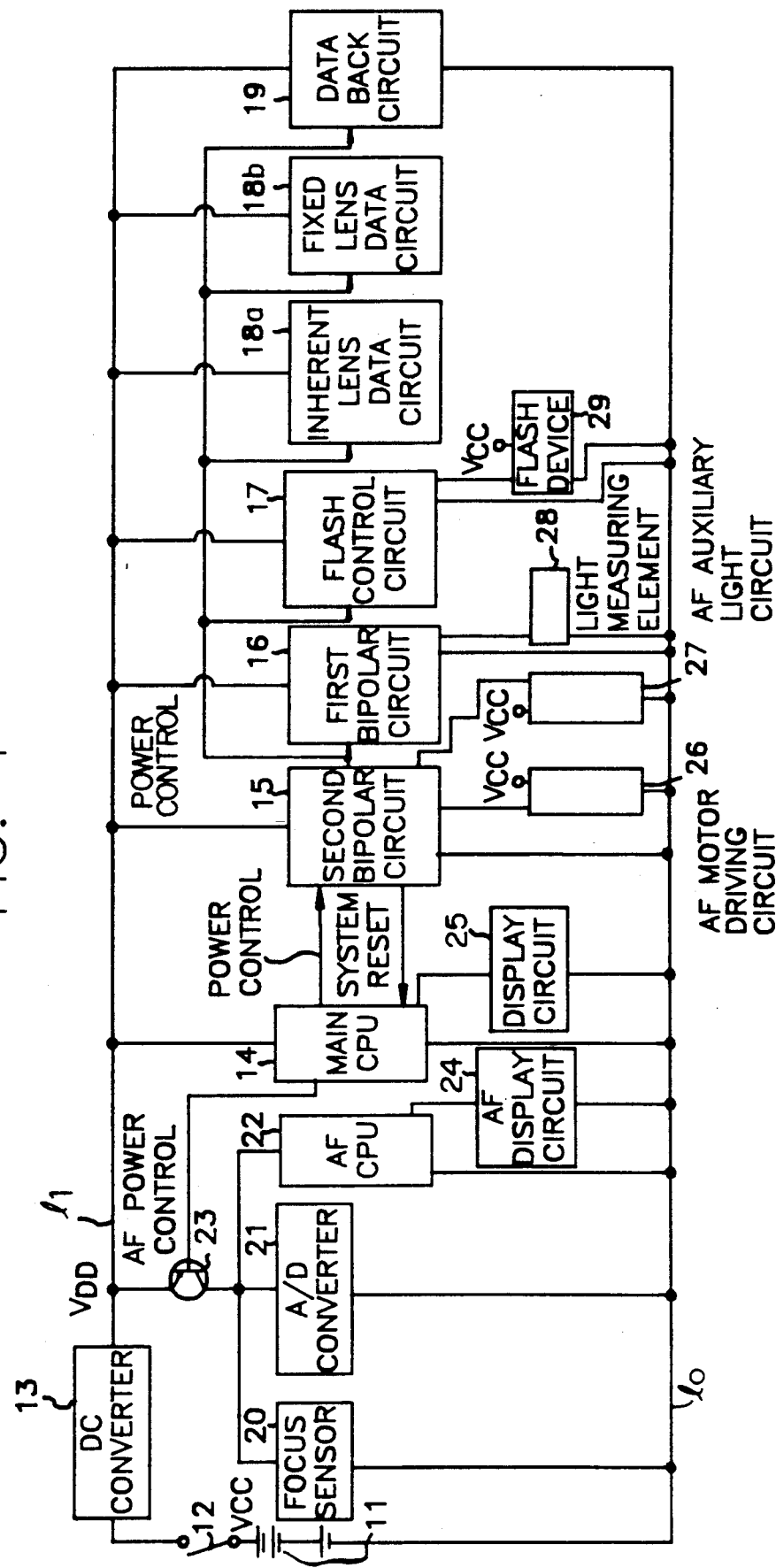
FIG. 4 is an overall block diagram of an embodiment of the present invention.

FIG. 4 is an overall block diagram of an embodiment of the present invention, mainly focusing on the power supply portion of a camera in which the present invention is embodied. The voltage $V_{cc}$ of a power source battery 11 is boosted by a dc converter 13 at the time of closing a power switch 12 so that the voltage between lines $1_0$ and $1_1$ is kept to be a constant voltage $V_{DD}$. Between lines $1_0$ and $1_1$ are connected a main CPU 14, a second bipolar circuit 15, a first bipolar circuit 16, a flash control circuit 17, an inherent lens data circuit 18a, a fixed lens data circuit 18b and a data back circuit 19. The power supply for the second bipolar circuit 15 is controlled by a signal from a power control circuit of the main CPU 14, and the power supply for the first bipolar circuit 16, the flash control circuit 17, the inherent lens data circuit 18a, the fixed lens data circuit 18b and the data back circuit 19 is controlled by a power control signal from the second bipolar circuit 15.

An AF block comprising a focus sensor 20, an A/D converter 21 and a CPU for AF 22 is connected between lines $1_0$ and $1_1$ through a power control transistor 23. The power supply for the AF block is controlled by the on-off control of the transistor 23 in response to a signal from an AF power control circuit of the main CPU 14.

The AF CPU 22 is a circuit for performing an AF algorithm operation and connected to an AF display circuit 24 for in-focus and defocus display.

The main CPU 14 is a circuit for controlling the sequence of the entire camera operation, such as winding and rewinding of the film, exposure, etc., and connected to a display circuit 25 for performing display other than the AF display.

The second bipolar circuit 15 is a circuit containing various drivers necessary for the sequence of the camera operation, such as motor control for winding and rewinding, lens drive, and shutter control, and connected to an AF motor driving circuit 26 and an AF auxiliary light circuit 27.

The first bipolar circuit 16 is a circuit mainly for light measuring and has a light measuring element 28.

The flash control circuit 17 is to control the light emission of a built-in or external electronic flash device 29.

The inherent lens data circuit 18a is a circuit for storing data inherent in an interchangeable lens which are different from lens to lens and necessary for the control of the camera, such as light measuring. In the lens data stored in the inherent lens data circuit 18a, the necessary data for AF are absolute distance coefficients a and b, a power focus duty coefficient, an AF precision threshold ETh, a lens moving direction, an open f-number, etc.

The fixed lens data circuit 18b is a circuit for storing fixed data which are not different from lens to lens and are necessary for calculating operation.

Alternatively, the data in the inherent lens data circuit 18a and the fixed lens data circuit 18b may be stored, for example, in a memory of the main CPU 14 or the AF CPU 22.

The second bipolar circuit 15 monitors the state of the supply volta $V_{DD}$. When the supply voltage becomes lower than a prescribed voltage, the second bipolar circuit 15 transmits a system reset signal to the main CPU 14, which then cuts off the power supply for the second bipolar circuit 15, the first bipolar circuit 16, the flash control circuit 17, the inherent lens data circuit 18a, the fixed lens data circuit 18b and the data back circuit 19, and the power supply for the AF block comprising the focus sensor 20, the A/D converter 21 and the AF CPU 22. The main CPU 14 is supplied with power even if the supply voltage is under the prescribed voltage.

Figure 5:
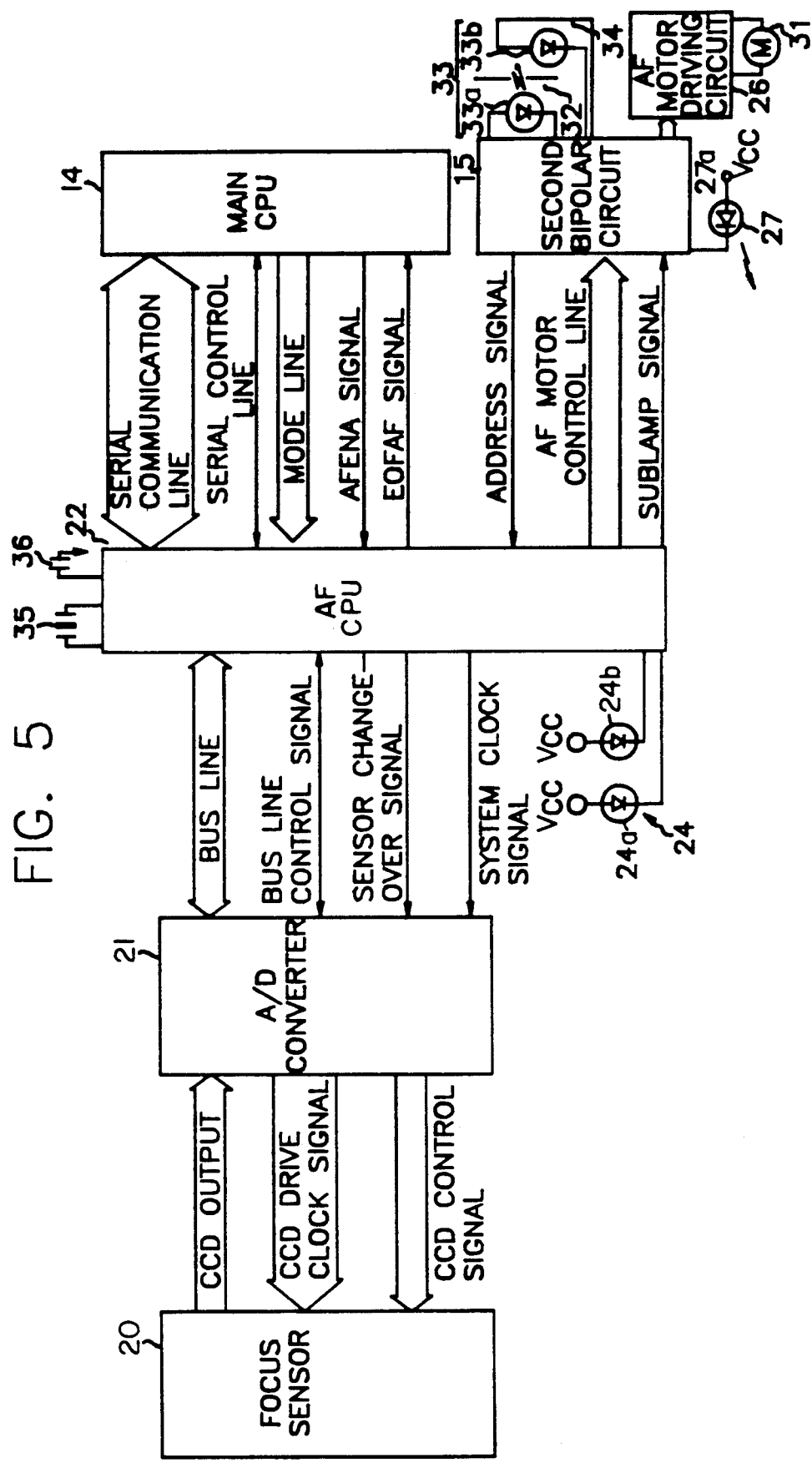
FIG. 5 is a diagram showing the transmission and reception of signals centering around the AF block in FIG. 4.

FIG. 5 is a diagram showing the transmission and reception of signals centering around the AF block. The AF CPU 22 and the main CPU 14 transmit and receive data via a serial communication line and the direction of transmission is controlled by a serial control line. The contents of the communication are inherent lens data in the inherent lens data circuit 18a, absolute distance information, etc.

Information on camera modes (AF single mode, AF sequence mode, power focus (hereinafter called "PF") mode, and other modes) is transmitted from the main CPU 14 through a mode line to the AF CPU 22. An AFENA (AF enabling) signal from the main CPU 14 to the AF CPU 22 is a signal for controlling the start and stop of the AF and PF modes, and an EOFAF (end of AF) signal from the AF CPU 22 to the main CPU 14 is a signal produced at the end of the AF and PF mode operation for permitting the transition to the exposure sequence.

The second bipolar circuit 15 decodes a signal of an AF motor control line from the AF CPU 22 and drives the AF motor driving circuit 26. When an AF motor (lens driving motor) 31 is rotated in response to the output of the AF motor driving circuit 26, slits 22 equally spaced in a rotating member of a lens barrel are rotated and counted by a photointerrupter 33 comprising a light emitting portion 33a and a light receiving portion 33b which are arranged across the moving path of the slits 22. That is, the slits 32 and the photointerrupter 33 form a lens moving amount detecting portion 34, and an address signal (count signal of slits 32) produced by the moving amount detecting portion 34 is subjected to wave shaping and inputted to the AF CPU 22.

A sublamp (hereinafter called "S lamp") signal transmitted from the AF CPU 22 to the second bipolar circuit 15 is a signal for controlling the AF auxiliary light circuit 27 to turn on an S lamp 27a when an object to be photographed is of low light (low luminance) and low contrast.

The AF display circuit 24 connected to the AF CPU 22 has an in-focus display LED (light emitting diode) 24a to be lighted at the time of in-focus and a focus impossible display LED 24b to be lighted when focusing is impossible. A clock generator 35 and a capacitor for reset 36 are connected to the AF CPU 22.

The AF CPU 22 and the A/D converter 21 transmit and receive data through a bus line and the direction of transmission is controlled by a bus line control signal. A sensor changeover signal and a system clock signal are transmitted from the AF CPU 22 to the A/D converter 21. The focus sensor 20 is formed, for example, by a CCD. The A/D converter 21 transmits a CCD drive clock signal and a CCD control signal to the focus sensor 20, reads out the CCD output from the focus sensor 20 and converts the read-out analog CCD output to a digital value to transmit it to the AF CPU 22.

Figure 6:
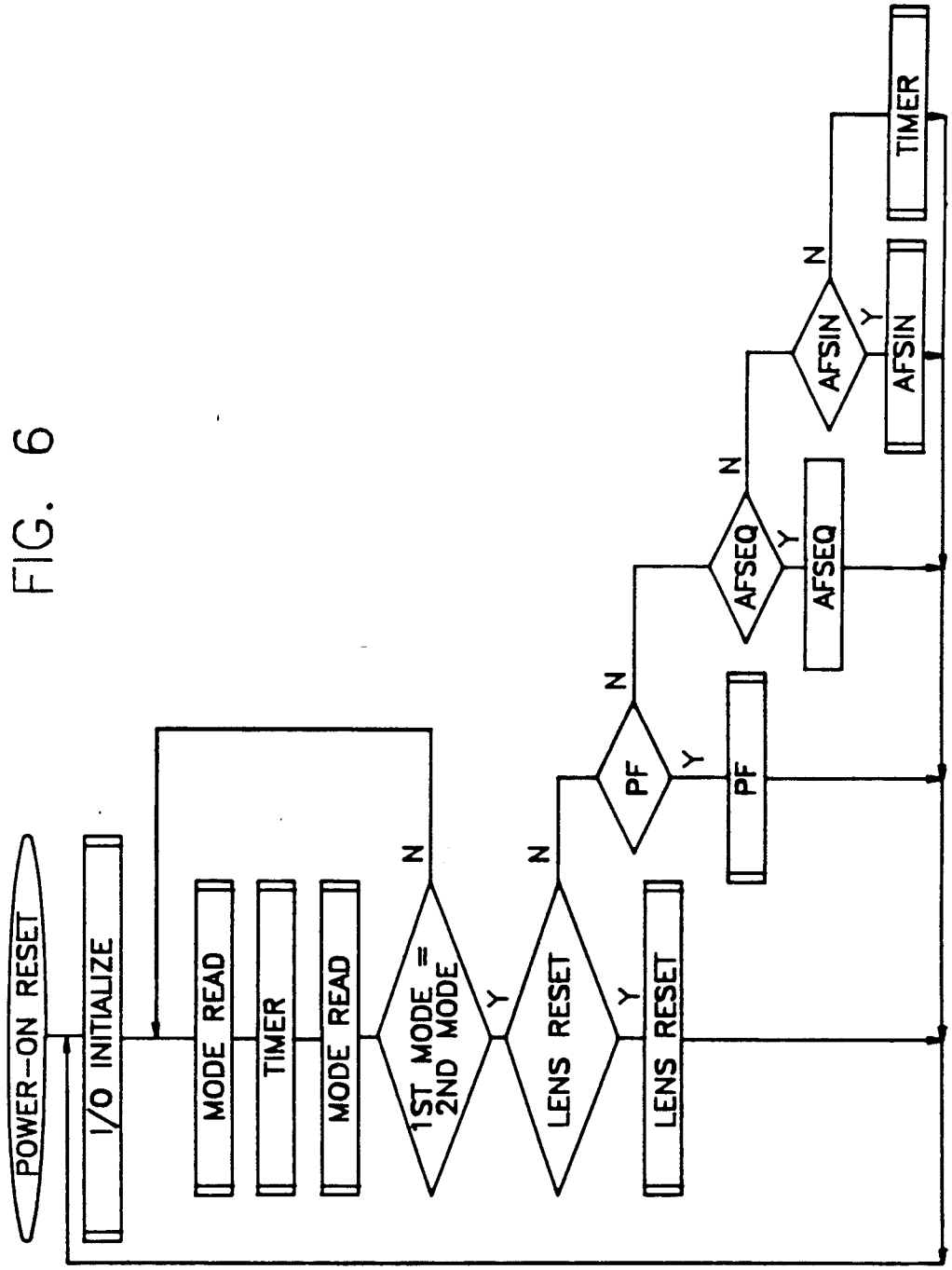
FIG. 6 is a flow chart of a Power-on Reset routine.

Next, flow charts of CPU program operation centering around the AF block shown in FIG. 5 will be explained. As shown in FIG. 4, when the AF power control circuit of the main CPU 14 is brought to its operative state, the transistor 23 is turned on to supply the AF block with the supply voltage $V_{DD}$, thereby starting the execution of a Power-on Reset routine shown in FIG. 6.

Upon the start of the Power-on Reset routine, the driving circuits of the AF block are initialized by an subroutine I/O Initialize. Namely, the AF display circuit 24, the AF motor driving circuit 26 and the AF auxiliary light circuit 27 are turned off, the serial communication line with the main CPU 14 is initialized, and so forth.

Then, in a subroutine Mode Read, a signal of the mode line (mode signal) from the main CPU 14 is read out to determine which lens drive mode is executed. Then, after passing a predetermined time in a routine Timer, the routine Mode Read is executed again to read the time point of mode changeover. Until the mode changeover is finished, the operation returns to the first Mode Read routine. The subroutine Mode Read is executed twice with the routine Timer interposed therebetween in order to avoid the reading error at the time of mode changeover.

When the mode has been surely changed over and the mode read out in the first Mode Read routine is identical with the mode read out in the second Mode Read routine, the second mode is read out and the operation goes to a subroutine corresponding to the read-out mode. As lens drive modes, there are Lens Reset, PF (Power Focus), AFSEQ (AF Sequence), and AFSIN (AF Single) modes. When one of these mode is selected, the subroutine for the selected mode is executed and the operation returns to the I/O Initialize routine. When none of the Lens Reset, PF, AFSEQ and AFSIN modes is selected and the other modes are selected, they are considered a mere noise and the operation returns to the I/O Initialize routine after passing a predetermined time in the Timer routine.

The Lens Reset mode is an operation mode for compulsorily moving the lens inwards to its infinite () position to initialize the operation in which the number of movement pulses for the lens to be driven in accordance with the distance measurement output signal outputted from the focus sensor 20 is transformed into the number of movement pulses from the infinite position to obtain an absolute distance signal (that is, the clearing operation of an absolute distance counter). When the Lens Reset mode is selected, the operation returns to the I/O Initialize routine, for example, five seconds after the clearance of the absolute distance counter.

The PF mode is an operation mode for driving the distance ring of the lens by the lens driving motor 31, not by the hand, to make the focusing operation of the lens by manual focusing or by using a focus aid (display of in focus or defocus information outputted from the focus sensor 20). More particularly, the lens is moved inwards and outwards by the turning on and off of the below-mentioned PFUP (power focus up) operation switch SW1 and PFDN (power focus down) operation switch SW2.

The AFSIN mode is a one-shot AF operation in which focus lock is made after the AF operation for an object to be photographed has been completed.

The AFSEQ mode is a continuous AF operation in which AF operation is continuously performed as long as the first-step pushing operation of the release button is continued.

As shown in the following table, four operating switches SW1 to SW2 are used as the operating switches for t he respective modes of lens driving.

| Operating switch | SW1 (up) | SW2 (down) | SW3 (PF) | SW4 (speed) | Mode |
| --- | --- | --- | --- | --- | --- |
| AF mode | off | off | off | * | Lens Reset |
|  | off | on | off | * | AFSIN |
|  | on | on | off | * | AFSEQ |
|  | on | off | off | * | (off) |
| PF mode | on | on | on | * | STOP |
|  | on | off | on | off | PFUP; LO |
|  |  |  |  | on | PFUP; HI |
|  | off | on | on | off | PFDN; LO |
|  |  |  |  | on | PFDN; HI |
|  | off | off | on | * | STOP |

(*: Either "on" or "off" may be selected.)

The first and second operating switches SW1 and SW2 shown in the above table are commonly used in both AF and PF modes. When the third operating switch SW3 is off, the AF mode is selected; when the third operating switch SW3 is on, the PF mode is selected. In the AF mode, when the first and second operating switches SW1 and SW2 are off, the Lens Reset mode is selected; when the first and second operating switches SW1 and SW2 are on, the AFSEQ mode is selected; when the first operating switch SW1 is off and the second operating switch SW2 is on, the AFSIN mode is selected. In the PF mode, when both first and second operating switches SW1 and SW2 are off or on, the STOP mode is selected; when the first operating switch SW1 is on, the PFUP (power focus up) mode is selected to rotate the distance ring towards the close distance side to move the lens outwards; when the second operating switch SW2 is on, the PFDN (power focus down) mode is selected to rotate the distance ring towards the far distance side to move the lens inwards.

The fourth operating switch SW4 does not influence all the AF modes and the Stop mode in the PF mode irrespective of its turning on or off. In the PF mode, when the fourth operating switch SW4 is on, a HI (high speed) mode is selected to rotate the lens driving motor 31 at a high speed for a rough adjustment of the distance ring; when the fourth operating switch SW4 is off, a LO (low speed) mode is selected to rotate the lens driving motor 31 at a low speed for a fine adjustment of the distance ring.

Figure 7:
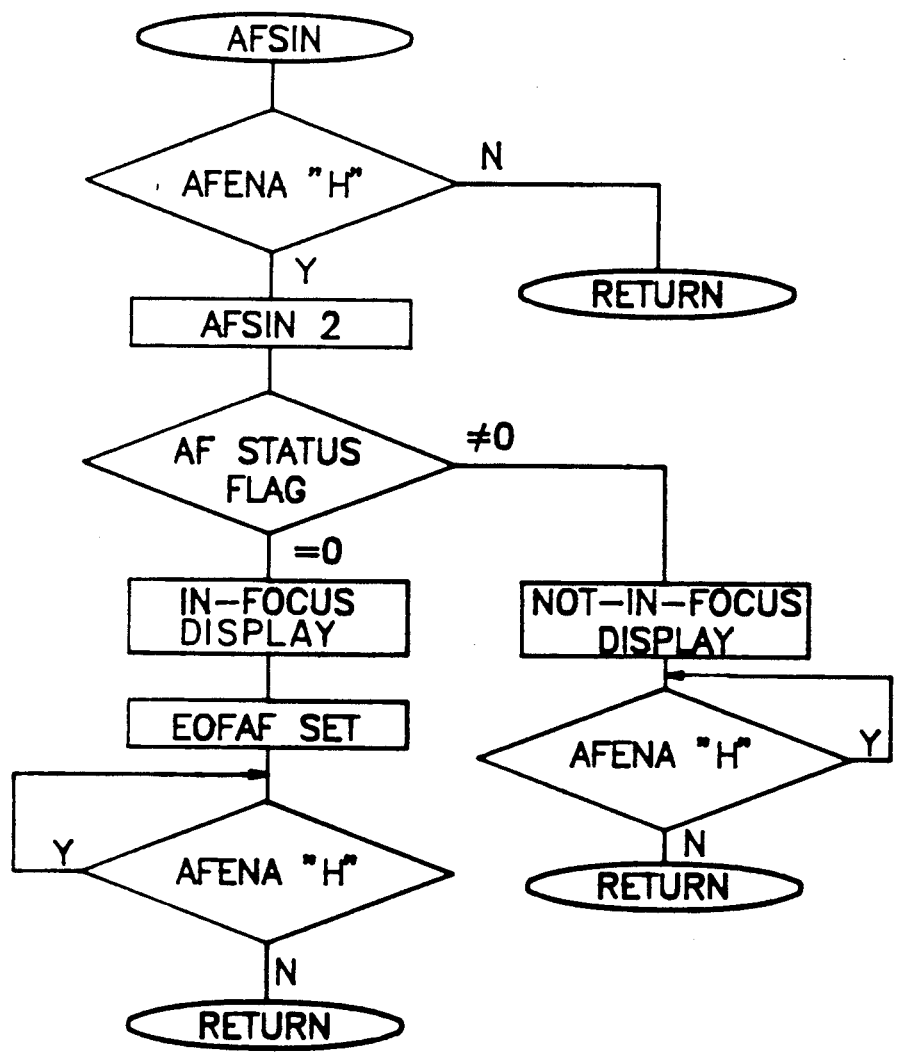
FIG. 7 is a flow chart of the AFSIN routine in FIG. 6.
Figure 8A:
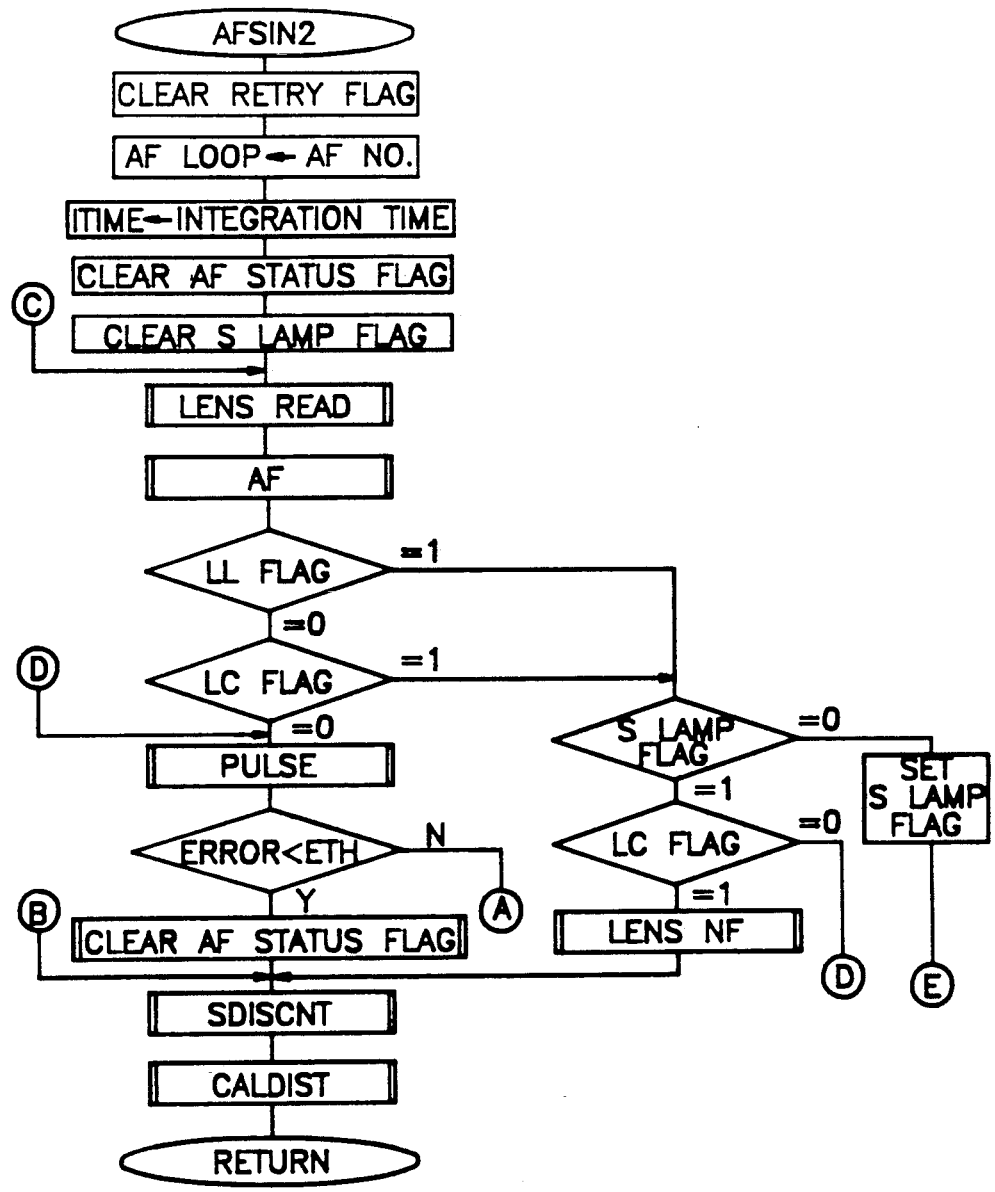
FIGS. 8(a) and 8(b) are flow charts of the AFSIN2 routine in FIG. 7.
Figure 8B:
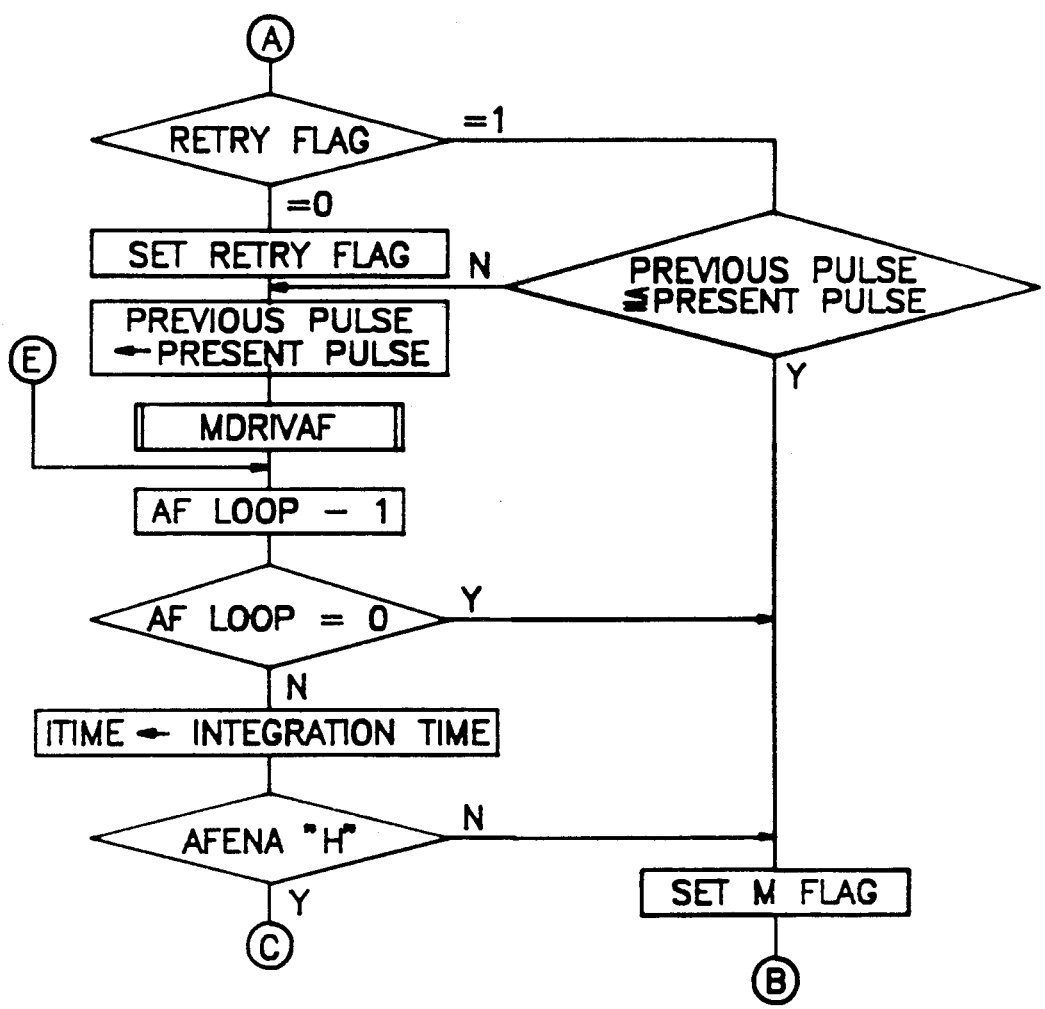

Now, referring to the flow charts shown in FIGS. 7 and 8, the operations in the respective lens driving modes are described.

First, when the AFSIN mode is selected, the AFSIN routine shown in FIG. 7 is executed to detect whether the AFENA signal from the main CPU 14 is at the "H" level (active). Upon the first step operation of the release button, the AFENA signal becomes active to start the AF operation and an AFSIN2 subroutine is called. However, the second step operation of the release button can be accepted only when the AF operation has been finished to obtain the in-focus state and the exposure sequence is started.

In the AFSIN2 routine, the CCD integration of the focus sensor 20, the calculation of a distance measurement output, lens driving, etc., are performed, as described below. The in-focus and not-in-focus states resulting from the AF operation of the AFSIN2 routine are displayed by monitoring an AF status flag after the operation of the AFSIN2 routine.

The AF status flag has a low contrast flag (hereinafter called "LC flag") to be set "1" when an object to be photographed is of low contrast; a movement flag (hereinafter called "M flag") to be set "1" when the object is moving; and a nearest distance flag (hereinafter called "N flag") to be set "1" when the lens is moved outwards over the nearest distance limit. When all of these flags are set "0", focusing operation is possible; when any of these flags is on, focusing operation is impossible. Therefore, when the monitoring of the AF status flag reveals that the AF status flag is "0", the in-focus display is made by the LED 24a of the AF display circuit 24; when the AF status flag is not "0", the not-in-focus display (focusing impossible display) is made by the LED 24b of the AF display circuit 24.

In the not-in-focus state, the system waits until the AFENA signal comes to the "L" level, then the operation returns. In the in-focus state, the EOFAF signal is produced to end the AF operation and the main CPU 14 waits the second step operation of the release button, that is, the start of the exposure sequence. Then, the AFENA signal is checked again.

When the focusing operation has been finished, even if the AFENA signal is active, a subsequent movement of the lens is prohibited and the LED 24a for in-focus display remains lighted, which is the focus lock state. When the AFENA signal from the main CPU 14 comes to the "L" level (inactive), the system returns to the initial operation of the flow chart Power-on Reset shown in FIG. 6.

The program operation of the AFSIN2 subroutine in the AFSIN mode is performed in accordance with the flow chart shown in FIG. 8. First, in order to compare the present distance measurement value (the present output pulses of the focus sensor 20) with the previous distance measurement value (the previous output pulses of the focus sensor 20), a RETRY flag is cleared and the maximum number of times of distance measurement to be performed in a series of AF operations is set in an AF loop counter. Then, in order to surely perform the CCD integration over a certain level of brightness, the longest CCD integration time is set in an ITIME register. Then, the AF status flag and the S lamp flag are cleared. This is the end of the initializing operation prior to the start of the AF operation.

Then, a Lens Read routine is called to read the lens data stored in the inherent lens data circuit 18a, and subsequently an AF routine for distance measurement is called. In the AF subroutine, it is determined whether it is necessary to light the S lamp 27a. If it is necessary, an S lamp flag is set; if it not necessary, the flag is cleared. Further, a low light flag (hereinafter called "LL flag") to be set when an object to be photographed is of low light, and the LC flag are set or cleared.

After the distance measurement operation by the AF subroutine, if both LL and LC flags are cleared, a Pulse routine is called to calculate the lens drive amount. That is, in the Pulse routine, in order to transform a distance measurement output value obtained by the operation of the AF routine into a movement value for each interchangeable lens, the number of pulses (address signal) corresponding to the movement to the in-focus point is calculated by using the movement coefficient and the distance measurement output value.

Figure 9:
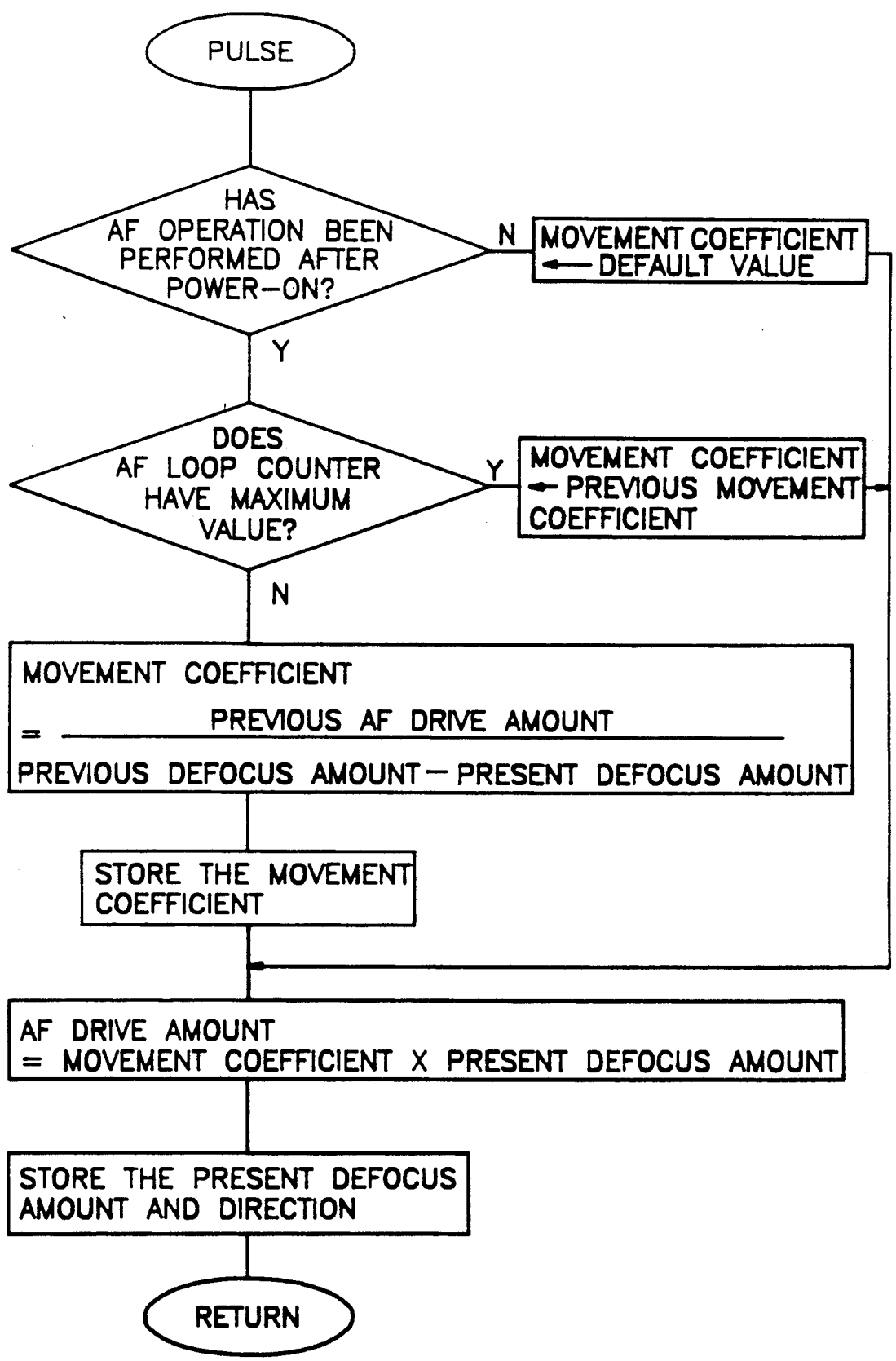
FIG. 9 is a flow chart of the Pulse subroutine in FIG. 8.

That is, as shown in the flow chart of the Pulse subroutine in FIG. 9, if no AF operation has been performed after the turning on of the power supply, the movement coefficient is a default value ("1"). If the AF loop counter indicates the maximum number of times of distance measurement, that is, the operation to be carried out is the first AF operation in the present series of AF operations, the movement coefficient at the time of the previous AF operation is used. If the operation to be carried out is the second or later AF operation in the present series of AF operations, the lens drive amount at the time of the previous AF operation is divided by the difference between the previous and present distance measurement output values to obtain the movement coefficient, which is then stored in the memory. The number of pulses (address signal) for AF driving is obtained by multiplying the movement coefficient and the present distance measurement output value together. After calculating the number of pulses, the present amount and direction of defocus are stored in the memory. When the Pulse subroutine is called next time, the stored amount and direction of defocus are used as the previous ones.

Then, the distance measurement output value (ERROR) is compared with the AF precision threshold ETh read out from the inherent lens data circuit 18a. If the distance measurement output value is larger than the AF precision threshold ETh, the operation goes to Ⓐ and the RETRY flag is tested. Since the RETRY flag is "0" in the first AF operation, the RETRY flag is set and the number of the driving pulses is saved.

In the second or later AF operation, since the RETRY flag has been set, the present number of driving pulses is compared with the previous number of driving pulses. If the present number of pulses is smaller than the previous number of pulses by the moving amount, it is concluded that the lens has approached the in-focus point by lens drive and will more approaches the point in the next lens drive. Thus, the present number of pulses is saved in place of the previous number of pulses, and a MDRIVAF routine is called to drive the lens.

The purpose of the comparison between the previous and present numbers of pulses is to prevent a divergent operation of the entire AF sequence. The way of comparison may be (the present number of pulses) : (the previous number of pulses×0.5), (the present number of pulses) : (the previous number of pulses×1.5), etc. If the AF sequence appears to be in a divergent state, it may be that the AF operation is being performed while an object to be photographed is moving. In this case, the lens drive is promptly stopped and in order to spare useless AF operation the M flag is set to proceed to ⓑ and SDISCNT and CALDIST routines are called as described below.

After the lens has been driven with the MDRIVAF routine, the number 1 is subtracted from the number of times of AF distance measurement set in the AF loop counter. If the resultant number is not zero, integration time is set in the ITIME register. Then, if the AFENA signal is active (that is, the first step operation of the release button is on), the operation returns to ⓒ for the next AF operation. Thus, whenever the AF operation between ⓒ and ⓒ is repeated, the number 1 is subtracted from the number in the AF counter and the lens will gradually approach the in-focus point. However, if the distance measurement output value (ERROR) is not smaller than the AF precision threshold ETh even if the AF loop counter indicates zero, focusing is deemed impossible and the M flag is set.

If ERROR<ETh as a result of the AF operation between ⓒ and ⓒ, that is, the distance measurement output value is in the range of allowable focus error, the AF status flag is cleared to indicate the in-focus state, and the SDISCNT and CALDIST routines are called.

After the operation of the AF routine, if the LL or LC flag has been set, the S lamp flag is tested. If the S lamp flag has been set "1", it means that the low light or low contrast state took place although the S lamp was lighted during the integrating operation for AF. In this case, the LC flag is tested again. Only in the low contrast state, a Lens NF (focusing impossible) routine is called to indicate positively that focusing is impossible.

That is, in the Lens NF routine, the lens is moved outwards to the closest position and then inwards to the infinite (∞) position to inform the user of focusing impossibility by this large movement of the lens. The lens movement to indicate focusing impossibility may be a movement from the infinite (∞) position to the closest position. Further, in the Lens NF routine, when the lens is brought to the infinite (∞) position, the absolute distance counter for saving the number of driving pulses from the infinite (∞) position of the lens distance ring (movement address signal) is initialized. If the LC flag does not indicate the low contrast state, it means that the AF operation was performed in the low light state; hence the operation returns to ⓓ.

If the S lamp flag has been cleared, it means that the S lamp was turned off. Thus, if the LL or LC flag has been set, the S lamp flag is set to proceed to ⓔ. Therefore, the S lamp 27a is lighted in the second and later AF operations.

In any case, at the end of the operation of the AFSIN2 routine, the SDISCNT routine is called and executed, and then the CALDIST routine is called. In the SDISCNT routine, the number of driving pulses from the infinite (∞) position of the distance ring is set in the absolute distance counter.

In the CALDIST routine, the absolute distance to an object to be photographed is calculated on the basis of the number of pulses set in the absolute distance counter and the absolute distance coefficients a and b in the inherent lens data circuit 18a. The calculated absolute distance and the contents of the absolute distance counter are transmitted to the main CPU 14. After the CALDIST routine is executed, the operation returns to the position after the AFSIN2 routine in the flow chart AFSIN shown in FIG. 7.

As described above, the movement coefficient used for calculating the lens drive amount for AF is not given by inherent data of a photographic lens as in the conventional method, but is obtained by feeding back the result of the AF operation. Thus, it is not necessary to provide each lens with its own data. Further, the influence of the difference of each lens from its design values can be eliminated.

In the case of a zoom lens, it is possible to roughen the division of the zoom encoder which was finely divided in the conventional method.

Moreover, also in a medium having a different index of refraction from that of air, such as water, a proper AF operation can be performed.

In the above embodiment, the movement coefficient is calculated by using the previous lens drive amount and the defocus amounts before and after the lens drive. However, it is also possible to use a value which is derived from a plurality of previous movement coefficients, for example, a mean value, a value obtained by extrapolation, etc. In this case, assuming that the movement coefficient and the defocus amount satisfy the following formula:

$$\text{Movement coefficient} = \frac{Y}{X + \text{defocus amount}} + Z$$

X, Y, and Z can be determined from information about a plurality of AF operations.

Further, if the movement coefficient has changed extraordinarily, it may be considered that the object to be photographed has moved greatly. This may be ignored and the previous movement coefficient may be used to perform the AF operation smoothly.

In the above embodiment, immediately after the turning on of the power supply, the movement coefficient is set as a default value ("1"). However, it is also possible to store the data in accordance with the design values of the lens in the inherent lens data circuit 18a so that the precision of the first AF operation may be enhanced. Then, the movement coefficient is corrected in conformity with the lens. Thus, the precision of the AF operation can be enhanced and the number of times of the AF operation can be reduced. Moreover, if zooming is made, the data are rewritten accordingly to further enhance the precision of the AF operation.

Additionally, if the distance to the object to be photographed is changing, the movement coefficient can be determined with the change taken into account so that a fast AF operation may be performed.

What is claimed is:

1. An autofocus apparatus for a camera having a taking lens, an image plane where the light from an object to be photographed is imaged by the taking lens, and a film plane; the autofocus apparatus comprising:

focus detecting means for detecting deviation information including the direction and amount of deviation of the image plane from the film plane;

first memory means for storing at a predetermined timing the deviation information detected by the focus detecting means;

second memory means for storing a movement coefficient which correlates the deviation amount and the drive amount of the taking lens;

drive amount calculating means for calculating the drive amount of the taking lens from the deviation information and the movement coefficient;

driving means for driving the taking lens in accordance with the drive amount calculated by the drive amount calculating means;

movement coefficient calculating means for calculating, after the drive of the taking lens by the driving means, a new movement coefficient from deviation information newly detected by the focus detecting means, the deviation information stored in the first memory means, and the drive amount of the taking lens; and movement coefficient resetting means for replacing the movement coefficient stored in the second memory means with the movement coefficient calculated by the movement coefficient calculating means, whereby the drive amount of the taking lens for the next drive is calculated by using the reset movement coefficient 2. The autofocus apparatus of claim 1, in which the movement coefficient calculating means calculates the movement coefficient from the formula: the previous drive amount / (the previous deviation information —- the present deviation information).

3. The autofocus apparatus of claim 1, in which if no automatic focusing operation has been performed after the turning-on of power, a predetermined value is used as the movement coefficient to calculate the drive amount of the taking lens.

4. The autofocus apparatus of claim 1 in which the drive amount calculating means calculates the moving amount of the taking lens from the movement coefficient multiplied by the amount of deviation.

5. A method of automatic focusing for a camera having a taking lens, an image plane where the light from an object to be photographed is imaged by the taking lens, and a film plane; the method comprising the steps of:

detecting deviation information including the direction and amount of deviation of the image plane from the film plane storing the detected deviation information in a first memory means;

calculating the drive amount of the taking lens from the deviation information and a movement coefficient which correlates the deviation amount and the drive amount of the taking lens and is stored in a second memory means;

driving the taking lens in accordance with the calculated drive amount;

detecting the deviation information again after the drive of the taking lens;

calculating a new movement coefficient from the previously detected deviation information stored in the first memory means, the newly detected deviation information, and the drive amount of the taking lens; resetting the calculated movement coefficient in the second memory means and the newly detected deviation information in the first memory means; and driving the taking lens next time by using the reset movement coefficient.

6. The method of claim 5, in which the movement coefficient is calculated from the formula: the previous drive amount / (the previous deviation information —- the present deviation information).

7. The method of claim 5, in which if no automatic focusing operation has been performed after the turning-on of power, a predetermined value is used as the movement coefficient to calculate the drive amount of the taking lens.

8. The method of claim 5, in which the drive amount of the taking lens is calculated by the movement coefficient multiplied by the amount of deviation.

9. An autofocus apparatus for a camera having a taking lens, an image plane where the light from an object to be photographed is imaged by the taking lens, and a film plane; the autofocus apparatus comprising:

detecting means for detecting a first amount of deviation of the image plane from the film plane;

memory means for storing a movement coefficient;

calculating means for calculating the drive amount of the taking lens on the basis of the first amount of deviation and the movement coefficient stored in the memory means;

driving means for driving the taking lens in accordance with the drive amount calculated by the calculating means;

moving amount detecting means for detecting the moving amount of the taking lens driven by the driving means;

the detecting means detecting a second amount of deviation of the image plane from the film plane on the basis of the light passing through the taking lens after the drive of the taking lens in accordance with the drive amount;

movement coefficient calculating means for calculating the movement coefficient on the basis of the first and second amounts of deviation and the moving amount detected by the moving amount detecting means; and movement coefficient resetting means for replacing the stored movement coefficient with the calculated movement coefficient.

10. The autofocus apparatus of claim 9, in which the movement coefficient calculating means calculates the movement coefficient by the formula: the moving amount detected by the moving amount detecting means / (the first amount of deviation — the second amount of deviation).

11. The autofocus apparatus of claim 9, in which before the movement coefficient is reset by the movement coefficient resetting means, a predetermined value is used as the movement coefficient to calculate the drive amount.

12. The autofocus apparatus of claim 9, in which the driving means comprises a motor for driving the taking lens via a rotating member which rotates in response to the drive of the motor, and the moving amount detecting means detects the amount of rotation of the rotating member.

13. The autofocus apparatus of claim 9, in which after resetting the movement coefficient the taking lens is driven on the basis of the second amount of deviation and the reset movement coefficient.

14. An autofocus apparatus for a camera having a taking lens, an image plane where the light from a object to be photographed is imaged by the taking lens, and a film plane; the autofocus apparatus comprising deviation amount detecting means for receiving the light passing through the taking lens and detecting the amount of deviation of the image plane from the film plane; first memory means for storing a movement coefficient necessary to calculate the drive amount of the taking lens from the amount of deviation; drive amount calculating mean for calculating the drive amount of the taking lens on the basis of the amount of deviation and the movement coefficient; and driving means for driving the taking lens to the in-focus position in accordance with the calculated drive amount, in which the improvement comprises:

second memory means for storing a first amount of deviation detected by the deviation amount detecting means;

the deviation amount detecting means detecting a second amount of deviation after the taking lens is driven in accordance with the drive amount calculated by the drive amount calculating means on the basis of the first amount of deviation and the movement coefficient;

movement coefficient calculating means for calculating an optimal movement coefficient from the first amount of deviation stored in the second memory means, the second amount of deviation, and the drive amount of the taking lens; and movement coefficient rewriting mean for replacing the movement coefficient stored in the first memory means with the calculated movement coefficient.

15. The autofocus apparatus of claim 14, in which the driving means comprises a motor for driving the taking lens via a rotating member which rotates in response to the drive of the motor; the autofocus apparatus further comprises moving amount detecting means for detecting the moving amount of the taking lens by detecting the amount of rotation of the rotating member; and the movement coefficient calculating means uses instead of the drive amount the moving amount detected by the drive amount detecting means to calculate the movement coefficient.

16. The autofocus apparatus of claim 14, in which the movement coefficient calculating means uses the drive amount calculated by the drive amount calculating means to calculate the movement coefficient.

17. The autofocus apparatus of claim 14, in which after the replacement of the movement coefficient the taking lens is driven on the basis of the second amount of deviation and the replaced movement coefficient.

18. An autofocus apparatus for a camera having a taking lens, an image plane where the light from an object to be photographed is imaged by the taking lens, and a film plane; the autofocus apparatus comprising:

deviation amount detecting means for receiving the light passing through the taking lens and detecting the amount of deviation of the image plane from the film plane;

rewritable memory means for storing a movement coefficient necessary to calculate the drive amount of the taking lens from the amount of deviation;

drive amount calculating means for calculating the drive amount of the taking lens on the basis of the amount of deviation and the movement coefficient;

driving means for driving the taking lens to the in-focus position in accordance with the calculated drive amount;

moving amount detecting means for detecting the moving amount of the taking lens driven by the driving means; and rewriting means for rewriting the movement coefficient stored in the memory means on the basis of the amounts of deviation detected before and after the drive of the taking lens by the driving means, and the moving amount of the taking lens detected by the moving amount detecting means.

19. An autofocus camera having a taking lens with an focusing optical system; an image plane where the light from an object to be photographed is imaged by the taking lens; and a film plane; the camera further comprising:

detecting means for detecting the amount and direction of deviation of the image plane from the film plane;

coefficient storing means for storing a transformation coefficient for transforming the detection result of the detecting means to the drive amount of the focusing optical system;

drive amount calculating means for calculating the drive amount of the focusing optical system from the detection result of the detecting means and the transformation coefficient stored in the coefficient storing means;

driving means for driving the focusing optical system in accordance with the calculated drive amount;

coefficient calculating means for calculating, after the drive of the focusing optical system by the driving means, a new transformation coefficient from the detection result used for the calculation of the drive amount, a detection result newly detected by the detecting means, and the drive amount of the focusing optical system; and resetting means for resetting the new transformation coefficient in the coefficient storing means, whereby the drive amount for the next drive is calculated by using the new transformation coefficient.

20. The camera of claim 19, in which the drive amount calculating means uses a predetermined value instead of the transformation coefficient at the time of the first calculation after the turning on of power.

21. An autofocus camera having a taking lens with an focusing optical system; an image plane where the light from an object to be photographed is imaged by the taking lens; and a film plane; the camera further comprising:

detecting means for detecting the amount and direction of deviation of the image plane from the film plane;

coefficient storing means for storing a transformation coefficient for transforming the detection result of the detecting means to the drive amount of the focusing optical system;

drive amount calculating means for calculating the drive amount of the focusing optical system from the detection result of the detecting means and the transformation coefficient stored in the coefficient storing means;

driving means for driving the focusing optical system in accordance with the calculated drive amount;

corrective calculating means for correcting, after the drive of the focusing optical system by the driving means, the transformation coefficient stored in the coefficient storing means by using the detection result used for the calculation of the drive amount, and a detection result newly detected by the detecting means; and resetting means for resetting the corrected transformation coefficient in the coefficient storing means, whereby the drive amount for the next drive is calculated by using the corrected transformation coefficient.

22. A method of controlling an autofocus camera having a taking lens with an focusing optical system; a image plane where the light from an object to be photographed is imaged by the taking lens; and a film plane; the method comprising the steps of:

detecting the amount and direction of deviation of the image plane from the film plane;

calculating the drive amount of the focusing optical system from the detection result and a given coefficient;

determining the focus state of the taking lens on the basis of the detection result;

if the in-focus state is found in the step of determining the focus state, terminating a series of automatic focusing operations;

if the in-focus state is not found in the step of determining the focus state, driving the focusing optical system in accordance with the drive amount; and returning to the step of detecting after the drive of the focusing optical system;

the step of calculating the drive amount further comprising the step of correcting, before the calculation of the drive amount, the given coefficient by using the newest detection result and the previous detection result.

23. A method of controlling an autofocus camera having a taking lens with an focusing optical system; an image plane where the light from an object to be photographed is imaged by the taking lens; and a film plane; the method comprising the steps of:

detecting the amount and direction of deviation of the image plane from the film plane;

calculating the drive amount of the focusing optical system from the detection result and a given coefficient;

driving the focusing optical system in accordance with the drive amount; and in the initial stage of a series of automatic focusing operations, preliminarily driving the focusing optical system, detecting the amounts and directions of deviation before and after the preliminary drive, and calculating the coefficient from the two detection results and the drive amount of the preliminary drive.

24. The method of claim 23, in which the drive amount of the preliminary drive is calculated from the detection result before the preliminary drive and a provisional coefficient.

25. The method of claim 23, in which the drive amount of the preliminary drive is a predetermined value.

26. A method of controlling an autofocus camera having a taking lens with an focusing optical system; an image plane where the light from an object to be photographed is imaged by the taking lens; and a film plane; the method comprising the steps of:

detecting the amount and direction of deviation of the image plane from the film plane;

calculating the drive amount of the focusing optical system from the detection result and a given coefficient; and driving the focusing optical system in accordance with the drive amount;

the step of calculating the drive amount further comprising the step of correcting, before the calculation of the drive amount, the given coefficient by using the newest detection result and the previous detection result.

27. The method of claim 26, in which at the time of the first calculation after the turning-on of power, the step of correcting is not executed, and a provisional coefficient instead of the coefficient is used to calculate the drive amount.

28. The method of claim 26, in which at the time of the first calculation in a series of autofocus operations, the step of correcting is not executed, and the coefficient already set is used to calculate the drive amount.

* * * * *